UNITED STATES PATENT OFFICE.

ANTONIO MEUCCI, OF CLIFTON, NEW YORK, ASSIGNOR TO ESTERRE MEUCCI, OF SAME PLACE.

IMPROVEMENT IN PREPARING HYDROCARBON LIQUIDS TO SERVE AS VEHICLES FOR PAINTS.

Specification forming part of Letters Patent No. 38,714, dated May 26, 1863.

*To all whom it may concern:*

Be it known that I, ANTONIO MEUCCI, of Clifton, in the county of Richmond and State of New York, have invented a new and Improved Process for Preparing Hydrocarbon Liquids for Paints, &c.; and I do hereby declare that the following is a full, clear, and exact description of the same.

The object of this invention is to prepare petroleum, kerosene, or other hydrocarbon liquids, so as to render the same fit for vehicles of paints, varnishes, &c., and also to decolorize said hydrocarbon liquids.

The invention consists in treating petroleum, kerosene, or other hydrocarbon liquids with hypochloronitric acid, ($NO_2Cl_2$,) which is obtained by mixing one part of nitric acid with three parts of muriatic acid and a sufficient quantity of starch to produce the desired reaction in such a manner that said hydrocarbon liquids are rendered siccative and consistent, and that they can be used as vehicles for paints and varnishes.

The invention consists, further, in uniting with petroleum, kerosene, or other hydrocarbon liquid a certain quantity of linseed, linseed-cakes, or linseed-oil, for the purpose of giving to said liquids the required consistency to render them fit for vehicles of paints, varnishes, &c., after treating with hypochloronitric acid.

To enable those skilled in the art to fully understand my process, I will proceed to describe it.

Petroleum, kerosene, or other similar hydrocarbon liquids, when mixed with paints in their natural state, cause the same to curdle and the paint is spoiled. This difficulty is obviated by treating petroleum, kerosene, &c., with hypochloronitric acid—a composition obtained by mixing one part of nitric acid with three parts of muriatic acid and a sufficient quantity of starch to produce the reaction. The chemical composition of this acid is expressed by the formula $NO_2Cl_2$, and its action on the hydrocarbon liquids is such that it renders the same siccative and consistent and fit to be used as vehicles for paints. It acts also as a decolorizing agent, so that the oils prepared by my process can be used for fine as well as for coarse work.

The consistency or body of the petroleum and kerosene can be still further improved by adding to it linseed-oil, or an extract derived from the cakes that are obtained in the manufacture of linseed-oil. These cakes, on being taken from the oil-press, retain a certain gummy substance which readily dissolves in petroleum or kerosene and imparts to the same the desired consistency.

What I claim as new, and desire to secure by Letters Patent, is—

1. The employment or use, in treating petroleum, kerosene, or other hydrocarbon liquids, of hypochloronitric acid, substantially in the manner and for the purpose described.

2. Mixing petroleum, kerosene, or other hydrocarbon liquid after treating the same with hypochloronitric acid, linseed-oil, linseed, or linseed-cakes, substantially as and for the purpose set forth.

ANTONIO MEUCCI.

Witnesses:
 J. W. COOMBS,
 M. S. PARTRIDGE.